(12) United States Patent
Aran et al.

(10) Patent No.: US 9,732,989 B2
(45) Date of Patent: Aug. 15, 2017

(54) HEAT RECEIVER TUBE, METHOD FOR MANUFACTURING THE HEAT RECEIVER TUBE, PARABOLIC TROUGH COLLECTOR WITH THE RECEIVER TUBE AND USE OF THE PARABOLIC TROUGH COLLECTOR

(75) Inventors: Hagai Aran, Tarum (IL); Menashe Barkai, Tel Aviv (IL); Gabriel Cohen, Shoham (IL); Rami Ezer, Ramat Gan (IL); Eli Lipman, Rishon LeZion (IL)

(73) Assignee: SIEMENS CONCENTRATED SOLAR POWER LTD., Beit Shemesh (IL)

( * ) Notice: Subject to any disclaimer, the term of this patent is extended or adjusted under 35 U.S.C. 154(b) by 691 days.

(21) Appl. No.: 14/008,156

(22) PCT Filed: Mar. 29, 2011

(86) PCT No.: PCT/EP2011/054810
§ 371 (c)(1),
(2), (4) Date: Jan. 30, 2014

(87) PCT Pub. No.: WO2012/130283
PCT Pub. Date: Oct. 4, 2012

(65) Prior Publication Data
US 2014/0130790 A1    May 15, 2014

(51) Int. Cl.
*F24J 2/24*    (2006.01)
*F24J 2/46*    (2006.01)
(Continued)

(52) U.S. Cl.
CPC .............. *F24J 2/46* (2013.01); *B21D 53/06* (2013.01); *F24J 2/055* (2013.01); *F24J 2/07* (2013.01);
(Continued)

(58) Field of Classification Search
CPC ...... F24J 2/46; F24J 2/07; F24J 2/4652; F24J 2/0488; F24J 2/05; F24J 2/06; F24J 2/10; F24J 2/51
See application file for complete search history.

(56) References Cited

U.S. PATENT DOCUMENTS 4,285,330 A * 8/1981 Shook .................. F24J 2/14
126/573
4,440,155 A    4/1984 Maloof
(Continued)

FOREIGN PATENT DOCUMENTS

CN    101023305 B    8/2007
DE    102008010316 A1    8/2009
(Continued)

*Primary Examiner* — Jason Lau (57) ABSTRACT

A heat receiver tube having first, second, and further partial heat receiver tube surfaces for absorbing and transferring solar energy to heat transfer fluid is presented. The first and further partial heat receiver tube surfaces are formed by solar absorptive coatings deposited on partial surfaces of core tube. The second partial heat receiver tube surface is formed by emission radiation inhibiting coating deposited on second core tube surface for inhibiting emissivity for infrared radiation. The further partial heat receiver tube surface is arranged in radiation window of second partial heat receiver tube surface such that direct sunlight impinges further partial heat receiver tube surface. The heat receiver tube is arranged in focal line of parabolic mirror of parabolic trough collector. The first partial heat receiver tube surface and sunlight reflecting surface is arranged face to face, second and further partial heat receiver tube surfaces are averted to reflecting surface.

17 Claims, 3 Drawing Sheets

(51) Int. Cl.
  *F24J 2/05* (2006.01)
  *F24J 2/07* (2006.01)
  *F24J 2/48* (2006.01)
  *B21D 53/06* (2006.01)

(52) U.S. Cl.
  CPC ............ *F24J 2/4652* (2013.01); *F24J 2/485* (2013.01); *Y02E 10/41* (2013.01); *Y02E 10/44* (2013.01); *Y10T 29/49355* (2015.01)

(56) References Cited

U.S. PATENT DOCUMENTS

| | | | |
|---|---|---|---|
| 4,505,260 A | | 3/1985 | Metzger |
| 5,602,384 A | * | 2/1997 | Nunogaki ............ B60H 1/0075 126/573 |
| 7,395,820 B2 | * | 7/2008 | Kuckelkorn ............ F24J 2/062 126/683 |
| 2005/0011513 A1 | * | 1/2005 | Johnson ................... F24J 2/07 126/698 |
| 2007/0209658 A1 | * | 9/2007 | Riffelmann ............ F24J 2/055 126/684 |

FOREIGN PATENT DOCUMENTS

| | | |
|---|---|---|
| EP | 0004805 A2 | 10/1979 |
| EP | 2093518 A1 | 8/2009 |
| WO | WO 2010032110 A1 | 3/2010 |

* cited by examiner

HEAT RECEIVER TUBE, METHOD FOR MANUFACTURING THE HEAT RECEIVER TUBE, PARABOLIC TROUGH COLLECTOR WITH THE RECEIVER TUBE AND USE OF THE PARABOLIC TROUGH COLLECTOR

CROSS REFERENCE TO RELATED APPLICATIONS

This application is the US National Stage of International Application No. PCT/EP2011/054810 filed Mar. 29, 2011 and claims benefit thereof, the entire content of which is hereby incorporated herein by reference.

BACKGROUND OF THE INVENTION

1. Field of the Invention

This invention relates to a heat receiver tube and a method for manufacturing the heat receiver tube. More over a parabolic trough collector with the heat receiver tube and a use of the parabolic trough collector are provided.

2. Description of the Related Art

A sun energy collecting unit of a sun field power plant based on the concentrated solar power technique comprises for instance a parabolic trough collector with at least one parabolic mirror and at least one heat receiver tube. The heat receiver tube is arranged in a focal line of the mirror. By sunlight reflecting surfaces of the mirror the sunlight is focused to the heat receiver tube, which is filled with a heat transfer fluid, e.g. a thermo-oil or molten salt. Via the heat receiver tube the energy of the sunlight is coupled into the heat transfer fluid. Solar energy is converted to thermal energy.

In order to maximize an efficiency, with which the energy of the sunlight is coupled into the heat transfer fluid, a solar energy absorptive coating is attached on a core tube surface of the heat receiver tube. Such an absorptive coating commonly comprises a multilayer stack with sequentially deposited thin film layers having different optical characteristics. For instance, the depositing the thin film layers are carried out by a sputtering method.

An essential overall optical characteristic of the absorptive coating is a high solar absorbance (low solar reflectivity) for wavelengths of solar spectrum (absorption radiation). Additionally a low emissivity (high reflectivity) for infrared radiation is essential, too. A coating with these optical characteristics is called selective solar coating.

SUMMARY OF THE INVENTION

It is an object of the invention to provide a heat receiver tube with an energy yield, which is improved in comparison to the state of the art. This should be fulfilled at high temperatures of 400° C. and more It is another object of the invention to provide a parabolic trough collector with the heat receiver tube.

A further object of the invention is to provide a use of the parabolic trough collector.

These objects are achieved by the inventions specified in the claims.

A heat receiver tube for absorbing solar energy and for transferring absorbed solar energy to a heat transfer fluid, which can be located inside a core tube of the heat receiver tube, is provided. The heat receiver tube comprises at least one first partial heat receiver tube surface, at least one second partial heat receiver tube surface and at least one further partial heat receiver tube surface. The first partial heat receiver tube surface is formed by a first solar energy absorptive coating for absorbing a first absorption radiation of a first certain spectrum of the sunlight, wherein the first solar energy absorptive coating is deposited on a first partial core tube surface of the core tube. The second partial heat receiver tube surface is formed by at least one emission radiation inhibiting coating for inhibiting an emissivity for infrared radiation, wherein the emission radiation inhibiting coating is deposited on a second core tube surface of the core tube. The further partial heat receiver tube surface is formed by at least one further solar energy absorptive coating for absorbing a further absorption radiation of a further certain spectrum of the sunlight, wherein the further solar energy absorptive coating is deposited on a further partial core tube surface of the core tube. The further partial heat receiver tube surface is arranged in a radiation window of the second partial heat receiver tube surface such, that the further absorption radiation can impinge the further partial heat receiver tube surface.

For instance, the first partial surface is formed by a first segment with a first circumference (segment angle) between 90° and 270°, whereas the second partial surface is formed by a second segment with a second circumference between 270° and 90°. Within the second segment a further segment with a further circumference between 10° and 40° is arranged.

Additionally a method for manufacturing a heat receiver tube is disclosed. The method comprises following steps:
a) Providing an uncovered core tube for a heat receiver tube with a first partial core tube surface, a second partial core tube surface and a further partial core tube surface; and
b) Attaching a first solar energy absorptive coating onto the first partial core tube surface, attaching an emission radiation inhibiting coating onto the second partial core tube surface and attaching a further solar energy absorptive coating onto the further partial core tube surface. The attaching of the emission inhibiting coating and the attaching of the further solar energy absorptive coating are carried out such, that the further solar energy absorptive coating is arranged in an inner lateral area of the emission radiation inhibiting coating. The further solar energy absorptive coating is at least partly surrounded by the emission radiation inhibiting coating such, that an impinging of the further absorption radiation into the further solar energy absorptive layer is possible.

Also provided is a parabolic trough collector comprising at least one parabolic mirror having a sunlight reflecting surface for concentrating sunlight in a focal line of the parabolic mirror and at least one heat receiver tube which is arranged in the focal line of the parabolic mirror. The heat receiver tube is arranged in the focal line such, that the first partial heat receiver tube surface with the first solar absorptive coating is at least partially located opposite to the sunlight reflecting surface of the parabolic mirror, whereas the second partial heat receiver tube surface with the emission inhibiting coating and the further partial heat receiver tube surface in the radiation window of the second partial heat receiver tube surface are at least partially averted to the sunlight reflecting surface of the parabolic mirror. Preferably lots of heat receiver tubes and parabolic mirrors are arranged together.

Finally a use of the parabolic trough collector in a power plant for converting solar energy into electrical energy is disclosed.

Sunlight (absorption radiation) in terms of this invention means in particular electromagnetic radiation from about 270 nm to 2500 nm. of the visible (certain) spectrum of the sunlight. But emission radiation with longer wavelengths of more than 2.500 nm is covered, too.

The concept of the invention is to optimize thermal characteristics of the heat receiver tube by maximizing a coupling of the solar energy (concentrated radiation energy) into the heat receiver tube via the first partial heat receiver tube surface and via the further partial heat receiver tube surface, whereas a minimizing of a loss of thermal energy via the second partial heat receiver tube surface is implemented. The first solar energy absorptive coating, which forms the first partial heat receiver tube surface, and the further solar energy absorptive coating, which forms the further partial heat receiver tube surface, are designed to absorb solar radiation as much as possible (absorbance more than 90% and preferably more than 92% or even more than 95%). These solar energy absorptive coatings are "selective coatings". In contrast to that, the emissivity via the second partial heat receiver tube, which is formed by the emission radiation inhibiting coating, is reduced. The emission radiation inhibiting coating is a "non-selective" coating.

Preferably a second selective solar energy coating for absorbing a second absorption radiation of a second certain spectrum of the sunlight is arranged between the second partial core tube surface and the emission radiation inhibiting coating. The radiation inhibiting coating is preferably directly attached to the second solar energy absorptive coating leading to a layer stack arranged on the second partial core tube surface of the core tube. This layer stack comprises the second solar energy absorptive coating and the emission radiation inhibiting coating.

Preferably the first solar energy absorptive coating and/or the second solar energy absorptive coating and/or the further solar energy absorptive coating form a common solar energy absorptive coating. There is just one kind of solar energy absorptive coating attached to the lateral area of the core tube. This common solar energy absorptive coating has all over identical or nearly identical chemical and physical characteristics. As a consequence the first absorption radiation of the first certain spectrum of the sunlight, the second absorption radiation of the second certain spectrum of the sunlight and/or the further absorption radiation of the further certain spectrum of the sunlight are identical or nearly identical. The use of just one kind of solar absorptive coating is advantageous as to the manufacturing of the heat receiver tube. It is easier to deposit just one kind of solar energy absorptive coating on the overall core tube surface of the core tube than to deposit more kinds of solar energy absorptive coatings on more partial core tube surfaces.

In a preferred embodiment concerning the manufacturing the attaching the first solar energy absorptive coating, the attaching the second solar energy absorptive coating and/or the attaching the further solar energy absorptive coating are carried out in one step. For instance, the manufacturing of the a heat receiver tube is carried out as follows: In a first step the common solar absorptive coating is deposited onto the (complete) lateral area of the core tube. In a second step the emission radiation inhibiting coating is deposited onto the common solar absorptive coating just in the area of the second partial core tube surface. In the area of the first partial core tube surface the common solar absorptive coating remains uncovered by the emission radiation inhibiting coating.

While the depositing of the emission radiation inhibiting coating the further partial core tube surface can be covered such, that the radiation window within the emission radiation inhibiting coating is formed. For that step a mask method is used.

Alternatively the emission radiation inhibiting coating is deposited on the complete area of the second partial core tube surface. After the deposition of the emission radiation inhibiting coating the radiation window is worked into the emission radiation inhibiting coating. This is carried out by removing material of the emission radiation inhibiting coating. The underlying common solar energy absorptive coating gets uncovered and forms the further partial heat receiver tube surface.

In an alternatively preferred embodiment of the heat receiver tube the second partial core tube surface is substantially uncovered by the first solar energy absorptive coating and/or is substantially uncovered by the further solar energy absorptive coating. The emission radiation inhibiting coating is preferably directly deposited onto the second core tube surface. Of course, at least one inter layer, which is different to the first solar absorptive coating and/or which is different to the further solar absorptive coating, can be arranged between the emission radiation inhibiting coating and the second partial core tube surface. Such an inter layer can be an IRR (infrared radiation)-layer, which is part of layer stacks of the first partial heat receiver tube surface, the second partial heat receiver tube surface and the further partial heat receiver tube surface. Such an interlayer can improve the adhesion of the subsequent deposited layers. For instance, the inter layer improves the adhesion of the emission radiation inhibiting coating on the second partial core tube surface.

The heat receiver tube can be arranged in the focal line of a parabolic mirror such, that solar radiation, which is concentrated by a reflecting surface of a parabolic mirror, impinges the first solar absorptive coating of the first partial heat receiver tube surface. The area of the heat receiver tube, which is not heated by this concentrated solar radiation (i.e. that area, which typically faces the sun), is coated by the emission radiation inhibiting coating. In addition the further partial heat receiver surface of the window of the radiation inhibiting coating faces the sun, too. So, direct solar radiation can impinge the further partial heat receiver surface.

Preferably the first partial heat receiver tube surface and/or the second partial heat receiver tube surface and/or the further partial heat receiver tube surface are aligned along a longitudinal alignment of the heat receiver tube. This characteristic is applied to the first core tube surfaces and/or the second core tube surface and/or the further core tube surface, too. The alignment along the longitudinal alignment of the heat receiver tube and the alignment along the longitudinal alignment the core tube, respectively, is advantageous as to an arrangement of the heat receiver tube in the focal line of the parabolic mirror.

The coupling of the concentrated radiation energy of the sun into the heat receiver tube is maximized and the loss of thermal energy of the heat receiver tube is minimized.

In a preferred embodiment the first partial heat receiver tube surface comprises a first segment of a lateral area of the heat receiver tube with a first circumference, which is selected from the range between 150° and 300° and preferably between 180° and 270°. In a further preferred embodiment the second partial heat receiver tube surface comprises a second segment of the lateral area of the heat receiver tube with a second circumference, which is selected from the range between 210° and 60° and preferably between 180° and 90°. In a still further preferred embodiment the further partial heat receiver tube surface comprises a further segment of the lateral area of the heat receiver tube with a further circumference, which is selected from the range between 10° and 40° and preferably between 15° and 30°.

The further segment is arranged within the second segment. The angles of the segments are optimized concerning the energy balance of the heat receiver tube (e.g. via RIM angle).

By the emission radiation inhibiting coating a magnitude of the emissivity of infrared radiation is reduced. The emissivity for infrared radiation of the radiation inhibiting coating is less than 30%. Preferably the emission radiation inhibiting coating comprises an emissivity for infrared radiation which is less than 20%.

In a preferred embodiment the emission radiation inhibiting coating comprises a metal which is selected from the group existing of Aluminum, Copper, Silver, Gold and Molybdenum. Other metals or alloys are possible, too. The emission radiation inhibiting coating can be metallic and can comprise one metal or more metals. For instance, the emission radiation inhibiting coating is a layer consisting of Copper. Such a coating with Copper blocks a heat radiation (emissivity) on the "upper" part of the heat receiver tube, which is impinged upon by direct solar radiation. This strongly reduces the overall heat loss of the heat receiver tube while losing some of the total radiation impinging thereupon.

The areas of the partial heat receiver tube surfaces don't have to have the same extent. The extents of the partial heat receiver tube surfaces are easily optimized as well as their location on the lateral surface of the heat receiver tube (e.g. due to RIM).

The individual partial heat receiver tube surfaces can be divided into two or more sub parts. For instance, the second partial heart receiver tube surface is divided into two parts by the radiation window formed by the further heat receiver tube surface. But preferably these partial surfaces are not divided. Therefore at least one of the partial heat receiver tube surfaces forms a contiguous area. The heat receiver tube is arranged in the focal line in parallel to the longitudinal alignment of the mirror. By this the absorption of solar energy is very efficient. Concentrated solar radiation impinges always the solar absorptive coating of the first partial heat receiver tube surface (intensity about 52 suns). Additionally, direct solar radiation, which can be concentrated, too (see below), impinges the further partial heat receiver surface. The second partial heat receiver tube surface is not impinged by the concentrated solar radiation (intensity about 0.6 suns). Very small amount of energy could be wasted while gaining much more in heat losses due to overall emissivity.

In a preferred embodiment a sunlight concentrating device is arranged in a concentrating distance to the heat receiver tube such, that the further absorption radiation can be concentrated onto the further partial heat receiver tube surface of the heat receiver tube. For instance such a sunlight concentrating device is a lens. Preferably the sunlight concentrating device is a Fresnel lens. Other types of lenses are possible, too. With the aid of the sunlight concentrating device direct sunlight (further solar absorption radiation) is focused on the further heat receiver tube surface with the further solar absorptive coating. This increases the absorption of the further solar radiation by the further solar absorptive coating.

By this measure the overall ratio of absorption to emissivity of the heat receiver tube is increased. The loss of direct sun radiation for the absorption is reduced, which would occur without the further partial heat receiver tube surface.

In order to improve the physical and chemical stability and the thermal characteristics of the heat receiver tube some other measures are additionally implemented. Preferably the heat receiver tube comprises at least one encapsulation for enveloping at least one of the partial heat receiver tube surfaces, wherein the encapsulation comprises at least one transparent encapsulation wall, which is at least partially transparent for the first absorption radiation and/or at least partially transparent for the second absorption radiation and/or at least partially transparent for the further absorption radiation. At least partially transparent is given in the case, that a transmission for the absorption radiations is more than 80% and preferably more than 90%.

For instance the encapsulation is a tube consisting of acryl glass. In a preferred embodiment the encapsulation is a glass ($SiO_2$) tube and the encapsulation wall is a glass tube wall. This is a very efficient encapsulation concerning the chemical and physical stability of the heat receiver tube as well as concerning the transparency for the absorption radiations.

In a further preferred embodiment the encapsulation wall comprises the sunlight concentrating device. By this a high chemical and physical stability and a high sunlight concentrating efficiency is possible.

Between the heat receiver tube surface of the heat receiver tube and the encapsulation wall there is a receiver gap. This receiver gap is preferably evacuated. This means that a gas pressure in the receiver gab is less than $10^{-2}$ mbar and preferably less than $10^{-3}$ mbar. This has the advantage, that a thermal heat transfer away from the heat receiver tube with the heat transfer fluid by convection is reduced. The thermal energy doesn't dissipate and is substantially completely available for the heating of the heat transfer fluid.

For the attaching of at least one of the solar energy absorptive coatings and/or for the attaching of the emission radiation inhibiting coating a thin film deposition technique is used The thin film deposition technique is preferably selected from the group consisting of atomic layer deposition, chemical vapor deposition and physical vapor deposition. The physical vapor deposition is for instance sputtering.

In order to get structured coatings structuring deposition techniques are used. At least one of the coatings is structured deposited. In a preferred embodiment the attaching of at least one of the solar energy absorptive coatings and/or the attaching of the emission radiation inhibiting coating are carried out with the aid of a mask method. Alternatively a coating can be deposited unstructured and after the deposition of the unstructured coating a structuring is carried out, e.g. by removing deposited material.

Following advantages are connected to the invention:
- The additional coupling of direct sunlight radiation into the heat receiver tube via the further partial heat receiver tube results in an increased utilization of solar energy for heating up a heat transfer fluid.
- The usage of different kinds of coatings for different areas of the heat receiver tube surface result in an overall higher ratio of absorption to emissivity of the complete heat receiver tube.
- A wide range of available materials is accessible for the emission radiation inhibiting coating of the second partial heat receiver tube surface of the heat receiver tube.
- A high blockage of heat radiation at the non-selective coated part (via the emission radiation inhibiting coating) results.

BRIEF DESCRIPTION OF THE DRAWINGS

Further features and advantages of the invention are produced from the description of exemplary embodiments with reference to the drawings. The drawings are schematic.

DETAILED DESCRIPTION OF THE INVENTION

Each example comprises a heat receiver tube 1 for absorbing solar energy and for transferring absorbed solar energy to a heat transfer fluid 2, which can be located inside a core tube 10 of the heat receiver tube. The core tube consists of a core tube wall 103 with steel.

The core tube 10 comprises a first partial core tube surface 101, a second partial receiver tube surface 12 and a further partial heat receiver tube surface 13.

The first partial heat receiver tube surface 11 is formed by a first solar energy absorptive coating 111 for absorbing a first absorption radiation of a first certain spectrum of the sunlight. Thereby the first solar energy absorptive coating is deposited on a first partial core tube 101 surface of the core tube 10. The first solar energy absorptive coating is a multilayer arrangement of different layers with different optical characteristics.

The second partial heat receiver tube surface 12 is formed by an emission radiation inhibiting coating 14 for inhibiting an emissivity for infrared radiation. Thereby the emission radiation inhibiting coating 14 is deposited on a second core tube surface 102 of the core tube 10. The emission radiation inhibiting coating 14 consists of Copper. Alternatively the emission radiation inhibiting coating comprises metallic Aluminium.

The further partial heat receiver tube surface 13 is formed by at least one further solar energy absorptive coating 131 for absorbing a further absorption radiation of a further certain spectrum of the sunlight. Thereby the further solar energy absorptive coating 131 is deposited on a further partial core tube surface 103 of the core tube 10.

The further partial heat receiver tube surface 13 is arranged in a radiation window 1211 of the second partial heat receiver tube surface 12 such, that the further absorption radiation 1311 can impinge the further partial heat receiver tube surface 13.

Figure 2:
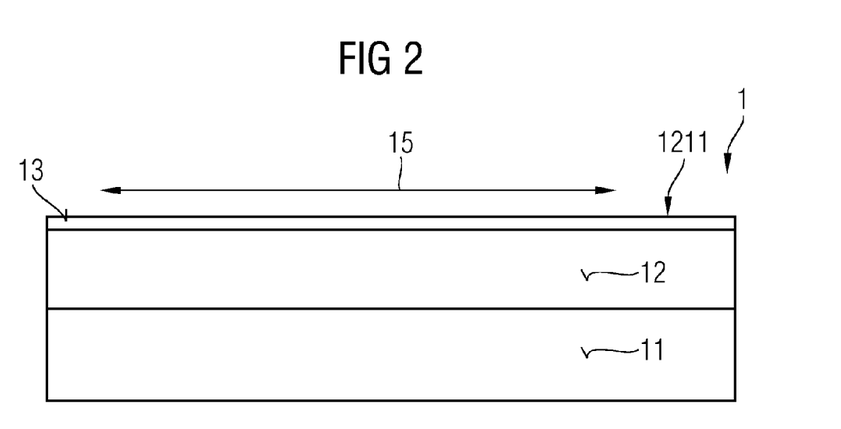
FIG. 2 shows the heat receiver tube of the first example in a side view.

The first partial heat receiver tube surface 11 forms a first segment 161 of the lateral area 16 of the heat receiver tube 1 with a first circumference 1611 of about 180°. The second partial heat receiver tube surface 12 forms a second segment 162 of the lateral area 16 of the heat receiver tube 1 with a second circumference 1612 of about 180°. The further partial heat receiver tube surface 13 forms a further segment 163 of the lateral area 16 of the heat receiver tube 1 with a further circumference 1613 of about 30°. Thereby the partial heat receiver tube surfaces 11, 12 and 13 are aligned along a longitudinal alignment 15 of the heat receiver tube 1 (FIG. 2).

Example 1

Figure 1:
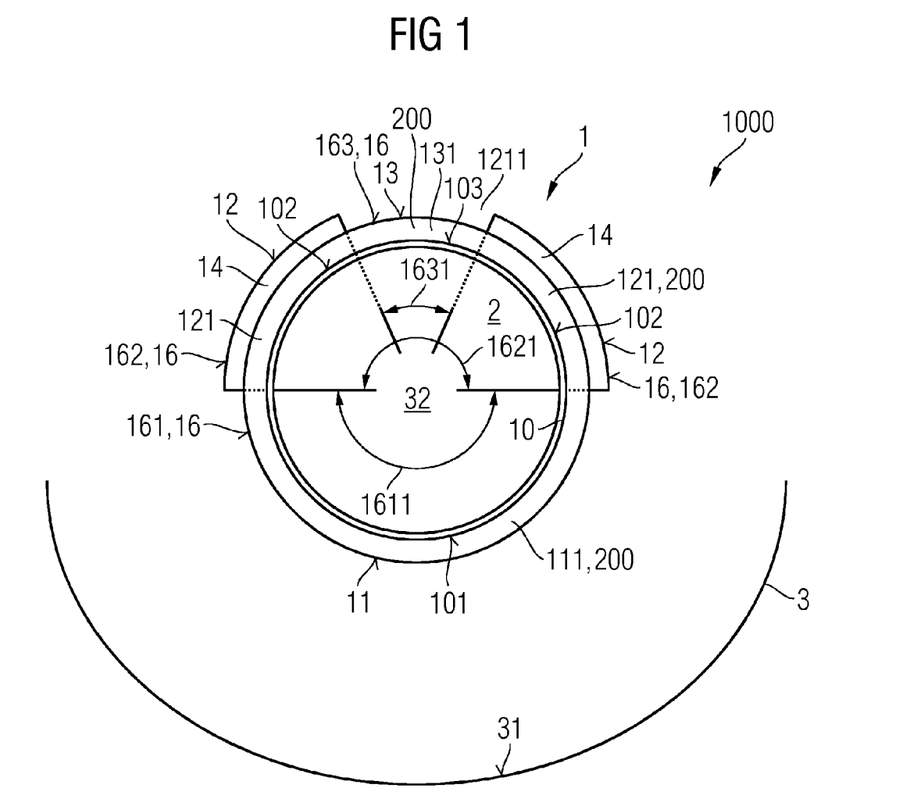
FIG. 1 shows a cross section of a first example of the heat receiver tube and a parabolic through collector with the heat receiver tube.

The emission radiation inhibiting coating 14 is not directly attached to the second partial core tube surface 102 (FIG. 1). The second partial core tube surface 102 is covered by a second solar energy absorptive coating 121 for absorbing a second absorption radiation of a second certain spectrum of the sunlight. The emission radiation inhibiting coating 14 is deposited onto the second selective solar energy coating 121 such, that the second selective solar energy coating 121 is arranged between the second partial core tube surface 102 and the emission radiation inhibiting coating 14.

The physical and chemical characteristics of the first solar energy absorptive coating 111, the second solar energy absorptive coating 121 and the further solar energy absorptive coating 131 are the same. The first solar energy absorptive coating 111, the second solar energy absorptive coating 121 and the further solar energy absorptive coating 131 form a common contiguous solar absorptive coating 200, which is deposited all over the latent area of the core tube surface of the core tube.

Example 2

Figure 3:
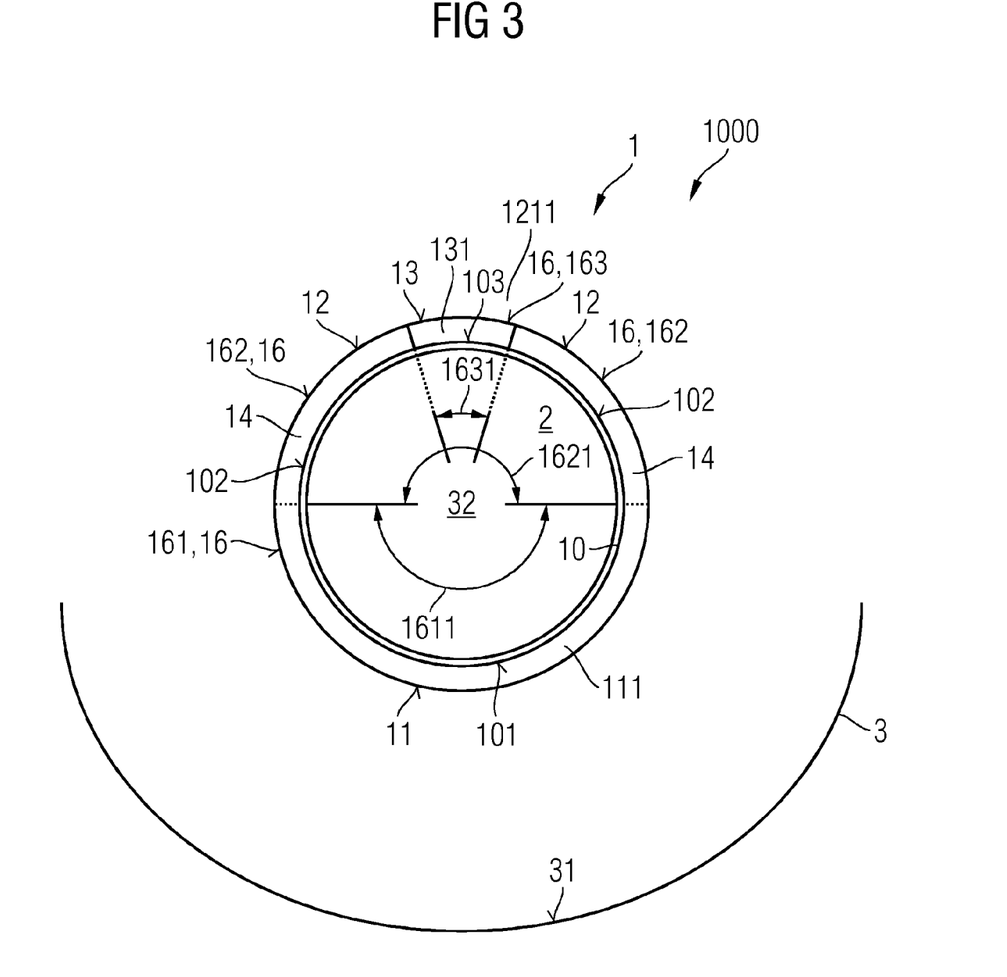
FIG. 3 shows a cross section of a second example of the heat receiver tube and a parabolic through collector with the heat receiver tube.

The emission radiation inhibiting coating 14 is directly attached to the second partial core tube surface 102 (FIG. 3). The second partial core tube surface 12 is substantially uncovered by the first solar energy absorptive coating 111 and is substantially uncovered by the further solar energy absorptive coating 131.

This kind of receiver tube can be manufactured as follows: Onto the lateral surface of an uncovered core tube a contiguous absorptive coating is deposited (e.g. with the aid of a sputtering process). After the deposition process material of the absorptive coating is removed in the area of the second partial core tube surface leading to an uncovered second partial core tube surface. After that the emission radiation inhibiting coating 14 is deposited onto the uncovered second partial core tube surface.

Figure 4:
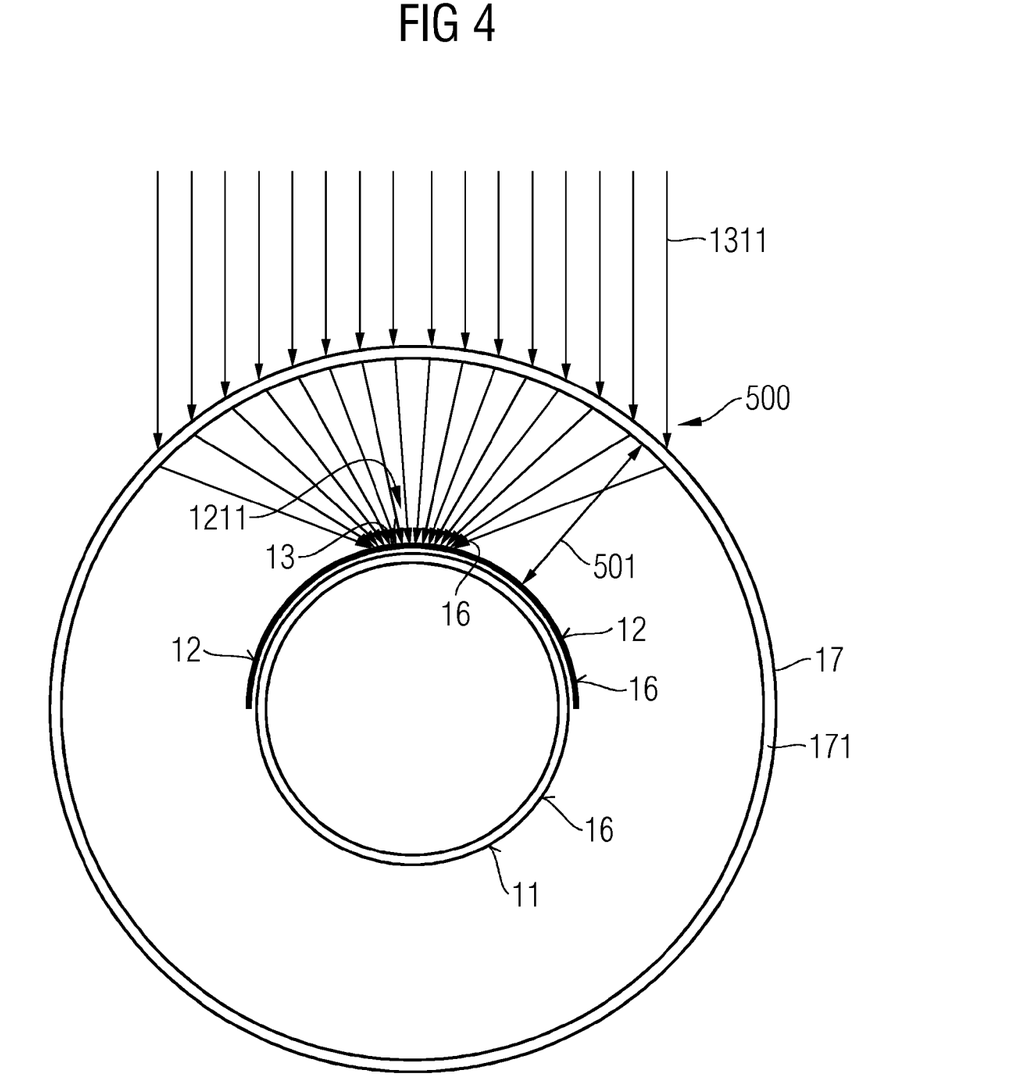
FIG. 4 shows a cross section of the heat receiver tube of the first example with an encapsulation.

FIG. 4 shows additional structural measures. These measures are implemented for both examples although FIG. 4 refers just to example 1: The heat receiver tube comprises an encapsulation 17 with an encapsulation wall for enveloping all partial heart receiver tube surfaces 11, 12 and 13.

The encapsulation 17 is a glass tube and the encapsulation wall 171 is a glass tube wall. The glass tube wall is transparent for the first absorption radiation and the further absorption radiation with a transmission of more than 90%. Between the glass tube wall and the receiver surface 16 a receiver gap is located. This receiver gap is evacuated. A gas pressure is about $10^{-3}$ mbar.

Additionally a sunlight concentrating device 500 is arranged in a concentrating distance 501 to the heat receiver tube surface of the heat receiver tube 1 such, that the further absorption radiation 1311 can be concentrated onto the further partial heat receiver tube surface 13 of the heat receiver tube 1. The sunlight concentrating device 500 comprises a Fresnel lens, which is located in the encapsulation wall (glass tube wall) 171. By this measure a concentration of the direct sunlight is possible.

The heat receiver tube concerning example 1 or concerning example 3 is part of a parabolic trough collector 1000. The parabolic trough collector 1000 comprises at least one parabolic mirror 3 with a sunlight reflective surface 31. By the reflective surface 31 sunlight is concentrated in the focal line 32 of the parabolic mirror 3.

The heat receiver tube 1 is located in the focal line 32 of the parabolic mirror 3. Thereby the first partial heat receiver tube surface 11 of the heat receiver tube ("lower" part of the receiver tube 1) is arranged opposite to the sunlight reflective surface 31 of the mirror 3. The second partial heat receiver tube surface 12 and the further partial heat receiver tube surface 13 in the radiation window 1211 of the second partial heat receiver tube surface 12 ("upper" part of the heat receiver tube 1) are averted to the sunlight reflective surface 31 of the mirror 3.

Inside the core tube 10 of the heat receiver tube 1 a heat transfer fluid 2 is located. The heart transfer fluid 2 is a thermo-oil. Alternatively the heat transfer fluid is a molten salt.

The parabolic trough collector is used in a solar power plant for converting solar energy into electrical energy.

The invention claimed is:

1. A heat receiver tube for absorbing solar energy and for transferring the absorbed solar energy to a heat transfer fluid located inside a core tube of the heat receiver tube, comprising:
   a first partial heat receiver tube surface;
   a second partial heat receiver tube surface; and
   a further partial heat receiver tube surface,
   wherein the first partial heat receiver tube surface is formed by a first solar energy absorptive coating for absorbing a first absorption radiation of a first certain spectrum of a sunlight, wherein the first solar energy absorptive coating is deposited on a first partial core tube surface of the core tube,
   wherein the second partial heat receiver tube surface is formed by at least one emission radiation inhibiting coating for inhibiting an emissivity for infrared radiation, wherein the emission radiation inhibiting coating is deposited on a second core tube surface of the core tube,
   wherein the further partial heat receiver tube surface is formed by at least one further solar energy absorptive coating for absorbing a further absorption radiation of a further certain spectrum of the sunlight, wherein the further solar energy absorptive coating is deposited on a further partial core tube surface of the core tube,
   wherein the further partial heat receiver tube surface is arranged in a radiation window of the second partial heat receiver tube surface such that the further absorption radiation can impinge the further partial heat receiver tube surface, and
   wherein the first solar energy absorptive coating, the at least one emission radiation inhibiting coating, and the at least one further solar energy absorptive coating form a complete lateral core tube surface of the core tube.

2. The heat receiver tube according to claim 1, wherein a second selective solar energy coating for absorbing a second absorption radiation of a second certain spectrum of the sunlight is arranged between the second partial core tube surface and the emission radiation inhibiting coating.

3. The heat receiver tube according to claim 2, wherein the first solar energy absorptive coating and/or the second solar energy absorptive coating and/or the further solar energy absorptive coating form a common solar energy absorptive coating.

4. The heat receiver tube according to claim 1, wherein the second partial core tube surface is substantially uncovered by the first solar energy absorptive coating and/or is substantially uncovered by the further solar energy absorptive coating.

5. The heat receiver tube according to claim 1, wherein the emission radiation inhibiting coating is directly deposited onto the second core tube surface.

6. The heat receiver tube according to claim 1, wherein the first partial heat receiver tube surface and/or the second partial heat receiver tube surface and/or the further partial heat receiver tube surface are aligned along a longitudinal alignment of the heat receiver tube.

7. The heat receiver tube according to claim 1,
   wherein the first partial heat receiver tube surface comprises a first segment of a lateral area of the heat receiver tube with a first circumference that is selected from a range between 150° and 300°, or between 180° and 270°,
   wherein the second partial heat receiver tube surface comprises a second segment of the lateral area of the heat receiver tube with a second circumference that is selected from a range between 210° and 60°, or between 180° and 90°,
   wherein the further partial heat receiver tube surface comprises a further segment of the lateral area of the heat receiver tube with a further circumference that is selected from the range between 10° and 40°, or between 15° and 30°.

8. The heat receiver tube according to claim 1,
   wherein the emission inhibiting coating comprises an emissivity for infrared radiation that is less than 20%,
   wherein the emission inhibiting coating comprises a metal that is selected from the group consisting of Aluminum, Copper, Silver, Gold, and Molybdenum.

9. The heat receiver tube according to claim 1, wherein at least one of the partial heat receiver tube surfaces forms a contiguous area.

10. The heat receiver tube according to claim 1,
    wherein a sunlight concentrating device is arranged in a concentrating distance to the heat receiver tube such that the further absorption radiation can be concentrated onto the further partial heat receiver tube surface of the heat receiver tube,
    wherein the sunlight concentrating device is a Fresnel lens.

11. The heat receiver tube according to claim 1,
    wherein the heat receiver tube comprises at least one encapsulation for enveloping at least one of the partial heat receiver tube surfaces,
    wherein the encapsulation comprises at least one transparent encapsulation wall that is at least partially transparent for the first absorption radiation and/or at least partially transparent for the second absorption radiation and/or at least partially transparent for the further absorption radiation,
    wherein the encapsulation is a glass tube and the encapsulation wall is a glass tube wall,
    wherein the encapsulation wall comprises a sunlight concentrating device.

12. A method for manufacturing a heat receiver tube, comprising:
    providing an uncovered core tube for a heat receiver tube comprising a first partial core tube surface, a second partial core tube surface, and a further partial core tube surface; and
    attaching a first solar energy absorptive coating onto the first partial core tube surface forming a first partial heat receiver tube surface, attaching an emission radiation inhibiting coating onto the second partial core tube surface forming a second partial heat receiver tube surface, and attaching a further solar energy absorptive coating onto the further partial core tube surface forming a further partial heat receiver tube surface,
    wherein the further partial heat receiver tube surface is arranged in a radiation window of the second partial heat receiver tube surface such that solar radiation can impinge the further partial heat receiver tube surface, and wherein the first solar energy absorptive coating, the at least one emission radiation inhibiting coating, and the at least one further solar energy absorptive coating form a complete lateral core tube surface of the core tube.

13. The method according to claim 12, wherein the attaching the first solar energy absorptive coating, the attaching the second solar energy absorptive coating and/or the attaching the further solar energy absorptive coating are carried out in one step.

14. The method according to claim 12,
wherein a thin film deposition technique is used for the attaching of at least one of the solar energy absorptive coatings and/or for the attaching of the emission radiation inhibiting coating,
wherein the thin film deposition technique is selected from the group consisting of atomic layer deposition, chemical vapor deposition, and physical vapor deposition.

15. The method according to claim 12, wherein a mask method is used for the attaching of at least one of the solar energy absorptive coatings and/or the attaching of the emission radiation inhibiting coating.

16. A parabolic trough collector, comprising:
a parabolic mirror comprising a sunlight reflecting surface for concentrating sunlight in a focal line of the parabolic mirror; and
a heat receiver tube comprising:
a first partial heat receiver tube surface;
a second partial heat receiver tube surface; and
a further partial heat receiver tube surface,
wherein the first partial heat receiver tube surface is formed by a first solar energy absorptive coating for absorbing a first absorption radiation of a first certain spectrum of a sunlight, wherein the first solar energy absorptive coating is deposited on a first partial core tube surface of the core tube,
wherein the second partial heat receiver tube surface is formed by at least one emission radiation inhibiting coating for inhibiting an emissivity for infrared radiation, wherein the emission radiation inhibiting coating is deposited on a second core tube surface of the core tube,
wherein the further partial heat receiver tube surface is formed by at least one further solar energy absorptive coating for absorbing a further absorption radiation of a further certain spectrum of the sunlight, wherein the further solar energy absorptive coating is deposited on a further partial core tube surface of the core tube, and
wherein the further partial heat receiver tube surface is arranged in a radiation window of the second partial heat receiver tube surface such that the further absorption radiation can impinge the further partial heat receiver tube surface,
wherein the heat receiver tube is arranged in the focal line of the parabolic mirror such that the first partial heat receiver tube surface with the first solar absorptive coating is at least partially located opposite to the sunlight reflecting surface of the parabolic mirror and the second partial heat receiver tube surface with the emission inhibiting coating and with the radiation window is at least partially averted to the sunlight reflecting surface of the parabolic mirror, and
wherein the first solar energy absorptive coating, the at least one emission radiation inhibiting coating, and the at least one further solar energy absorptive coating form a complete lateral core tube surface of the core tube.

17. The parabolic trough collector according to claim 16, wherein the parabolic trough collector is used in a power plant for converting solar energy into electrical energy.

* * * * *